Figure 1:
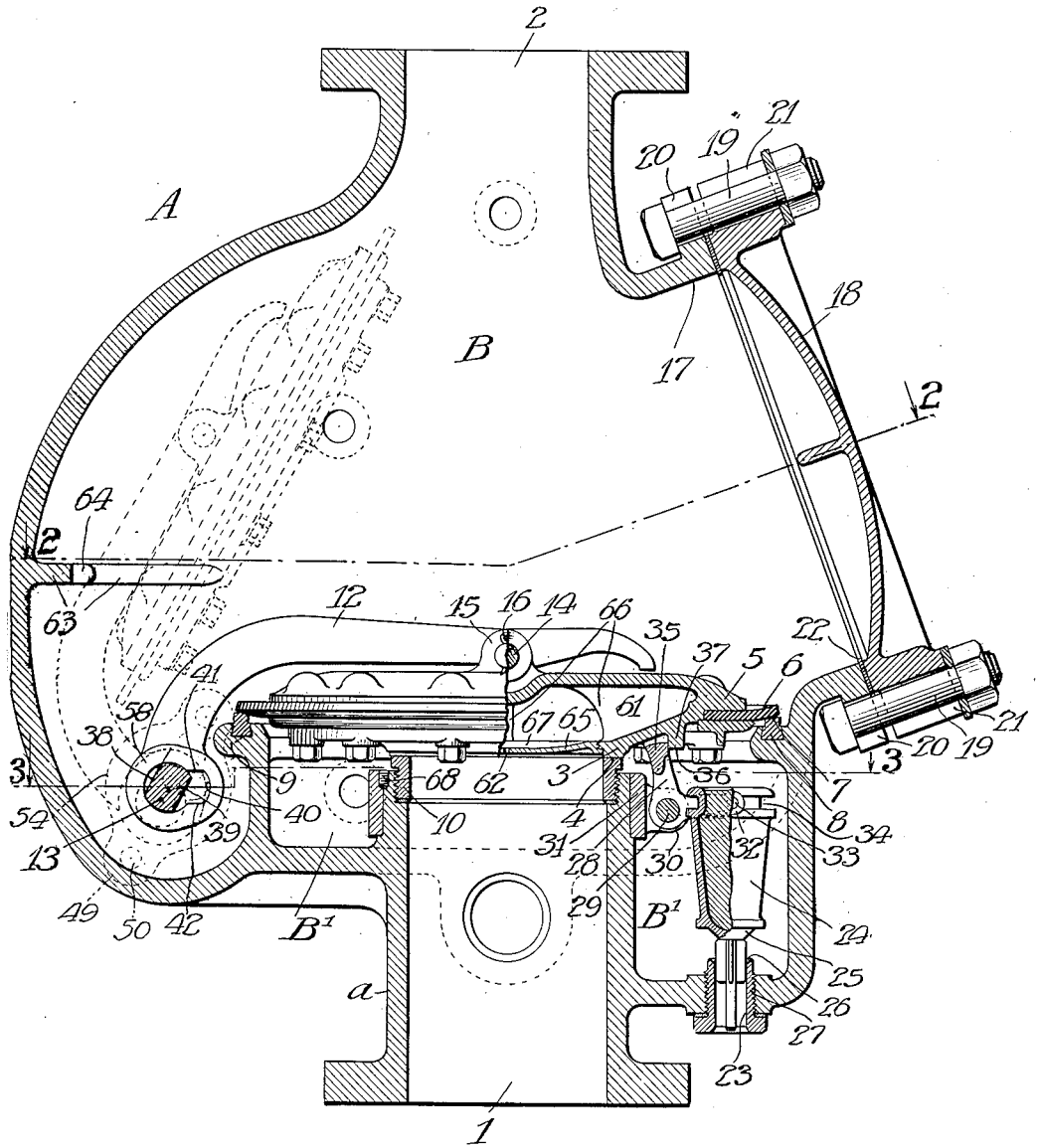

May 23, 1933.  B. B. CARTER  1,911,107
DRY PIPE VALVE FOR AUTOMATIC SPRINKLER SYSTEMS
Filed June 21, 1926   2 Sheets-Sheet 1

Inventor
Byron B. Carter

Witness
Martin H. Olsen

May 23, 1933.  B. B. CARTER  1,911,107
DRY PIPE VALVE FOR AUTOMATIC SPRINKLER SYSTEMS
Filed June 21, 1926  2 Sheets-Sheet 2
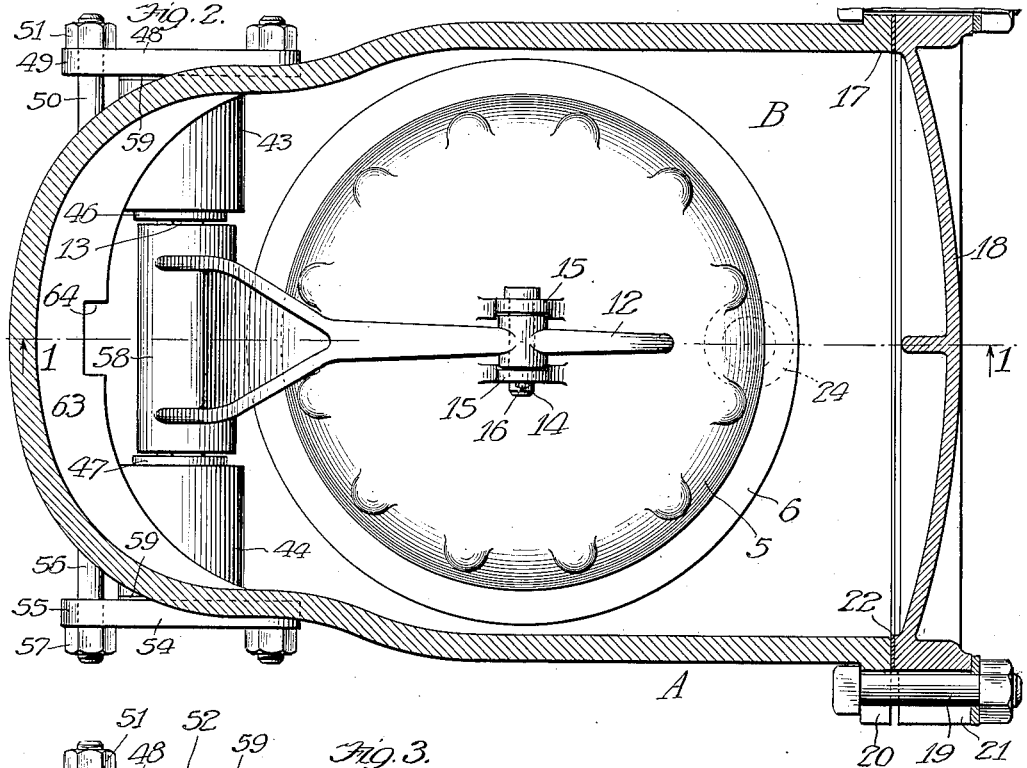
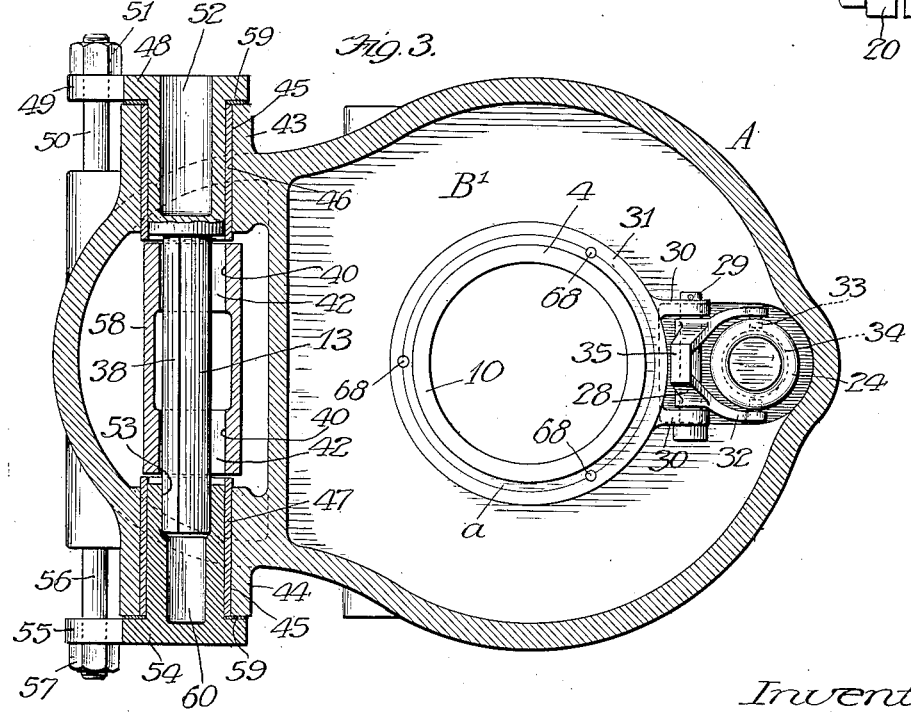
Witness
Martin H. Olsen.
Inventor
Byron B. Carter
By W. E. Waldo,
Atty.

Patented May 23, 1933

1,911,107

UNITED STATES PATENT OFFICE

BYRON B. CARTER, OF HINSDALE, ILLINOIS

DRY PIPE VALVE FOR AUTOMATIC SPRINKLER SYSTEMS

Application filed June 21, 1926. Serial No. 117,387.

This invention relates to dry pipe valves for automatic sprinkler systems.

Stated generally, the objects of the invention are to provide a dry pipe valve of new and novel construction, which shall be simple in construction, strong and durable; which comprises a minimum number of operating parts constructed and arranged to prevent the valve from being rendered inoperative through carelessness or design in setting said valve; and which can be manufactured at relatively small cost as compared with other dry pipe valves of which I have any knowledge.

Specific objects of the invention are to provide a new and novel form of lock or latch for securing the valve in fully opened position; to provide a differential valve of novel construction, and means in association therewith for expediting and insuring full opening of the valve when the valve is tripped; and to provide an improved seat for the air valve constructed and arranged to maintain a substantially uniform differential between the water and air pressures under contemplated operating conditions.

To effect the various objects of the invention, a dry pipe valve embodying my invention and improvements comprises the various features, combinations of features, and details of construction hereinafter described and claimed.

In the accompanying drawings, in which the invention is fully illustrated,

Figure 1 is a sectional side view of a dry pipe valve embodying my invention, substantially on the line 1—1 of Fig. 2; and Figures 2 and 3 are sectional plan views on the lines 2—2 and 3—3, respectively, of Fig. 1.

Describing the invention with particular reference to the drawings, A designates the valve casing as a whole, said casing being provided with a water admission opening 1, formed by a tubular neck portion $a$ of the casing, adapted to be connected to a suitable source of water supply, not shown, and said casing also being provided with a water discharge opening 2 adapted to be connected with the main riser of an automatic sprinkler system, not shown.

The water admission opening 1, is controlled by a valve 3, a seat on which is adapted to engage a corresponding seat formed at the inner end of said water admission opening, as shown at 4, and, in operation, said water valve is adapted to be maintained closed against the water pressure at the water admission opening by means of a differential air clapper 5, a flexible gasket 6 on which is adapted to engage a valve seat 7 formed on a ring 8, secured in position on a circular extension 9 of the valve casing which surrounds the tubular neck $a$ forming the water admission opening 1.

As shown, the valve seat 4 at the inner end of the water admission opening is formed on a separate collar 10 secured to the inner end of the hollow neck $a$.

The water valve 3 and air clapper 5 are preferably formed integral with each other and are secured to an arm 12, an end of which is pivoted to a pin 13 secured against rotation within the valve casing A, the relation being such that said pivoted arm will guide the water valve 3 and air clapper 5 in their movement from closed to open position, and vice versa. As shown, said water valve and air clapper are pivotally connected to the arm 12 by a pivot pin 14 which extends through holes formed in said lever arm and in lugs 15 formed on the air clapper 5, said pin 14 being loosely fitted to the holes in said arm and lugs, and being confined in position by cotter pins 16 or other suitable means.

The valve casing A is provided with a usual opening 17 which, in operation, is closed by means of a cover plate 18 adapted to be secured in closed position by means of clamping bolts 19 which extend through marginal slots formed in flanges 20 and 21 formed on the casing A and on the door 18, respectively. To form a tight joint around said door, a gasket 22 is clamped between the opposed seats formed on the valve casing and the door, in a usual manner.

The air clapper 5 divides the interior of the valve casing A into separate compartments B, B', the compartment B communicating directly with the sprinkler system, and the compartment B' being connected to atmosphere by a drain opening 23.

The drain opening 23 is controlled by a drip valve 24, a seat 25 formed on which is adapted to engage a corresponding seat 26 formed at the inner end of a bushing 27 secured in the hole or opening formed in the valve casing, in which the drain opening 23 is formed directly. As shown, the bushing 27 has screw-threaded engagement with said opening. In the preferable construction shown, said drip valve consists of hollow casing, which may be cast from any suitable metal, preferably brass, and is filled with any suitable heavy metal, as lead, preferably before the valve is finished.

In operation, the drip valve 24 is maintained normally open by a bell crank lever 28 pivoted to a pin 29 secured in holes formed in lugs 30 on a ring 31 secured to the upper end of the tubular neck $a$ forming the water admission opening. Said bell crank lever 28 comprises arms 32 which extend on opposite sides of the drip valve 24, secured in which are pins 33 which engage a groove 34 formed in said drip valve adjacent to its upper end. Formed on the upper end of the bell crank is a latch 35 which is adapted to engage a surface 36 formed on a stop lug 37 formed on the air valve 5, the relation being such that when the latch 35 is in engagement with the stop lug 37, the bell crank lever 28 will support the drip valve 24 in open position. Said drip valve 24 will operate in the usual manner to permit water to drain out of the compartment B' of the valve casing when open, and will fall by gravity to close the drain opening 23 when the air valve is raised a sufficient distance to release the latch 35 on the bell crank lever 28 from the stop lug 37 on said air valve, thus permitting said bell crank lever to turn pivotally under the weight of said drip valve, and thus prevent the water valve 3 from reseating.

As regards their usual features and, excepting as hereinafter particularly described and pointed out, all of the foregoing parts are old and well known and will readily be understood by persons familiar with the art from an examination of the drawings, without a description thereof in detail.

In accordance with my invention, I effect the object thereof, as it relates to providing improved and simplified means for securing the air and water valve in open position, in the following manner:

The pin 13, to which the guide arm 12 which supports the air and water valve is pivoted, is secured in fixed position in the walls of the valve casing in the manner presently described, and is provided on opposite sides with parallel flat surfaces 38 and 39, and formed in one side of the pivot bearing in the guide arm 12 is a recess 40 which has parallel flat sides 41 and 42 adapted to receive the pivot pin 13 when the parallel flat sides 38 and 39 thereof are brought into register with the flat sides 41 and 42 of the recess 40 by turning movement of the guide arm 12 on its pivot, in a direction to open the valve, the relation being such that the flat sides of said pin and recess are thus brought into register with each other when the valve is in full designed open position. The recess 40 is proportioned to receive the pivot pin 13 with only slight clearance, and the relation is such that when the guide arm 12 is turned into position corresponding to full open position of the valve, the recess 40 will be at the upper side of the pivot pin 13 so that said guide arm 12 will fall by gravity to effect engagement of the flat sides of the recess 40 with the flat sides of the pivot pin 13, thus effectually locking said arm against pivotal movement and securing the air valve in fully open position, until the guide arm is raised bodily to disengage the recess 40 from the pivot pin 13, which can only be done by opening the cover plate 18, which affords the sole means of access to the interior of the valve casing, when installed for use.

In the preferable construction shown, the means for securing the pin 13 in position is as follows: Formed in bosses 43 and 44 on the valve casing A are holes 45, said holes being made of considerable length and secured therein, preferably with a light driving fit, are bushings 46 and 47, the outer ends of which are substantially flush with the bosses in which they are secured, respectively, and the inner ends of which project inwardly a short distance through the holes 45.

Formed on one end of the pin 13 is what, for purposes of convenient reference, may be designated a gland, 48, the body portion of which is made of a size to fit the holes in the bushings 46 and 47, and formed on the outer end thereof is a flange 49 provided with holes adapted to receive studs 50 secured in the valve casing and threaded to which, outside of said flange 49, are nuts 51, providing means for drawing the flange 49 into close contact with the face of a boss 43 or 44. The studs 50 also secure the gland 48—and thus the pin 13—against rotation. As shown, the outer end of the gland 48 is recessed, as shown at 52, thus reducing the weight thereof.

At its end remote from the gland 48, the pin 13 is supported in a bearing 53 formed in the end of a gland 54, the body portion of which is of the same diameter as the body portion of the gland 48, so that said glands 48 and 54 will be interchangeable in the bushings 46 and 47, whereby the pin 13 may be inserted from either side of the valve casing and will be equally operative in either position.

Formed at the outer end of the gland 54 is a flange 55 provided with holes adapted to receive studs 56 secured in the valve casing, to which nuts 57 are threaded outside of the flange 55, thus providing means for drawing the flange of said gland into strong contact with the end or face of the boss on the valve casing, into which it is inserted, in substantially the same manner as described in connection with the flange 49 on the gland 48.

The bushings 46 and 47 are proportioned so that when the pin 13 with its mountings are assembled, adequate clearance will be provided between the inner ends of said bushings and the ends of the hub portion 58 of the pivoted guide arm 12.

The holes 45 through the bosses 43 and 44 on the valve casing are sealed so as to prevent leakage of air and water therethrough by means of usual packing gaskets 59 inserted between the opposed faces of said bosses and of the flanges 49 and 55 of the glands 48 and 54, said gaskets preferably extending inwardly over the outer ends of the bushings 46 and 47.

A particular advantage of the construction above described in which the mountings for the pin 13 comprise the bushings 46 and 47, is that all danger of forcing the ends of the glands 48 and 54 inwardly into contact with the ends of the hub 58 of the guide arm 12, thus resisting and possibly preventing, turning movement of said guide arm—as might occur without said bushings—is obviated, thus insuring operativeness of said guide arm at all times. As shown, the gland 54 is recessed as shown at 60, thus reducing the weight thereof to a minimum.

To attain the object of the invention as it relates to providing a differential valve of novel construction and means in association therewith for expediting and insuring full opening of the valve promptly and at relatively low operating pressures, I attain the object of the invention in the following manner: The differential valve, consisting of the water valve 3 and air clappers 5, which form a unitary structure and are preferably made integral with each other, is hollow, providing a chamber 61 within said clapper, and formed in the lower wall thereof is an opening 62 through which the chamber formed in said clapper is adapted to communicate with the water admission opening 1 of the valve casing, when the valve is set for operation. Also, the chamber 61 in said clapper is made as large as practicable without unduly impairing the strength and rigidity of the valve structure.

With the described construction, it is obvious that when the valve is set for operation the chamber in said clapper will be filled with fluid under the same pressure as the water within the tubular neck $a$ forming the water admission opening 1.

In practice, the chamber 61 will be so proportioned that under designed maximum water pressures it will contain only a small quantity of water, the rest of said chamber being filled with air under compression, corresponding to the pressure of the water at the valve inlet. Thus, when the valve is tripped, the differential valve will be turned pivotally by the current of water entering the valve casing through the admission opening and later—as the differential valve approaches its fully open position—by the jet of fluid discharged through the orifice 62 against the solid column or body of water in the valve casing, the reaction of said jet operating to impart a sudden "kick" to said differential valve which will expedite and insure its full opening as it passes out of the direct waterway of the valve defined by the water admission and discharge openings thereof.

As the invention relates to maintaining a substantially uniform differential between the water and air pressures under contemplated operating conditions, I attain the object thereof by crowning the valve seat 7 on the ring 8 and in so positioning the clapper 5 that the gasket 6 will be subjected to flexure when the valve is fully seated, the relation being such that contact of the gasket 6 with the crowned valve seat 7 will be on a line closely adjacent to the inner edge thereof and also closely adjacent to the outer edge of said gasket, whereby the air pressure in the system will exert very little pressure on said gasket tending to wrap it around the crowned valve seat outside of the designed line of contact of said gasket therewith, and the short projecting edge of said gasket being very stiff to resist any pressure exerted thereon, thus resulting in maintaining a substantially constant differential between the air and water valves under all operating conditions.

Preferably, also, a dry pipe valve embodying my invention and improvements comprises means to prevent the formation of eddy currents behind the air-clapper due to the flow of water through the valve casing when the water-valve is open which will retard turning movement of said air-clapper into fully open position—this being an objection inherent in many dry pipe valves heretofore produced.

In my improved dry pipe valve, such eddy currents are prevented by means of what may be called a baffle plate or ledge 63 formed on the interior of the valve casing in such position that it will be behind the air-clapper when open, said baffle plate being shaped to conform substantially to the shape of the rear side of the air-clapper when in open position, and being provided in its outer edge with a notch 64 adapted to receive the guide arm 12 for the air-clapper. Also, said baffle plate or ledge is so proportioned that when the guide arm 12 is in fully open position, with the recess 40 in the pivot bearing of the guide arm 12 in engagement with the flat sides of the pivot pin 13, the free edges of said baffle plate or ledge will extend into close proximity thereto, but with slight clearance at all points.

With the described construction, it is obvious that said baffle plate or ledge will effectually prevent the formation of eddy currents behing the air-clapper by a flow of water through the valve from the admission opening 1 to the discharge opening 2.

Also, the baffle plate 63 will operate in an obvious manner to reinforce and strengthen the valve casing A.

To provide for coring out the chamber 61 in the differential valve, said valve preferably comprises a separate removable section 65 in its under side, positioned within the seat 4 of the water valve. In the preferable construction shown, said removable section 65 has screw-threaded engagement with an opening formed in the body of the valve.

As shown, the main body portion of the differential valve is reinforced and strengthened by interior ribs 66 and the removable section 65 by interior ribs 67.

As shown, the means for securing the ring or collar 31 upon its seat on said hollow neck consists of screws 68 which have threaded engagement with holes formed partly in the ring or collar 31 and partly in the upper end of the tubular neck $a$. After the screws 68 are turned into engagement with said holes, they are dressed off flush with the upper face of said neck $a$ and ring or collar, thus preventing their removal by any ordinary means. The screws 68 also act as dowels to position the bearings for the pin 29 in proper relation to the drip valve 24.

In accordance with accepted practice, the water admission and discharge openings 1 and 2 are in alignment with each other. A particular advantage of this relation in connection with the formation of the water valve seat 4 and the bearings for the pivot pin 29 on the separate parts 10 and 31, respectively, is that practically all of the machine work on the valve casing may be done in a single jig and with a single setting, thus insuring absolute accuracy in the position and relations of different parts and of different holes, openings and finished surfaces, and also effecting a large economy in the performance of the work, represented principally in saving of time.

I claim:—

1. A dry pipe valve comprising a casing provided with water admission and discharge openings, a differential valve comprising a water-valve which controls the water admission opening and a relatively large air-clapper adapted for maintaining said water-valve closed under contemplated operating conditions, a pivoted guide arm by which said air-clapper is supported, and locking means for securing said air-clapper in fully open position rendered operative by bodily falling movement of the guide arm to which said air-clapper is secured, the movement of the pivoted guide arm corresponding to movement of the air-clapper from closed to fully open position being a turning movement only.

2. A dry pipe valve as specified in claim 1, in which the locking means is rendered operative by abrupt falling movement of the guide arm.

3. A dry pipe valve as specified in claim 1, in which the means for securing said air-clapper in open position is applied at the pivoted end of the guide arm which supports said air-clapper.

4. A dry pipe valve as specified in claim 1, in which the pivot bearing for the guide arm which supports the air-clapper is constructed and arranged to permit bodily falling movement of said arm when it attains a predetermined open position, and thereby to effect engagement of locking surfaces formed on said pivoted arm and a part fixed relatively thereto.

5. A dry pipe valve as specified in claim 1, in which the guide arm which supports the air-clapper is pivoted upon a pin secured in fixed position in the valve casing and is provided with a flattened surface and the pivot bearing on the arm is provided with a recess adapted to receive the flattened portion of said pin when in fully open position, said recess also having a flattened side, the relation being such that engagement of said recess with the pivot pin will be effected by bodily falling movement of said pivoted guide arm and will effect engagement of flattened surfaces on said guide arm and pivot pin thereby locking said arm from turning on said pin.

6. A dry pipe valve as specified in claim 1, in which the guide arm which supports the air-clapper is pivoted upon a pin secured in fixed position in the valve casing and is provided with parallel flat surfaces, and the pivot bearing in said arm is provided with a recess also having parallel flat sides, said recess being proportioned to receive the flattened portion of said pivot pin and the relation being such that the parallel flat sides of the recess in said bearing will be brought into register with the parallel flat side of said guide pin when said air-clapper is in fully open position.

7. A dry pipe valve comprising a casing provided with water admission and discharge openings, a differential valve comprising a water-valve which controls the water admission opening and a relatively large air-clapper adapted for maintaining said water-valve closed under contemplated operating conditions, a guide arm by which said air-clapper is supported, and a fixed pin mounted in holes formed in and which extend through the walls of the valve casing on which said guide arm is pivoted, the means for mounting said pin comprising glands one formed on an end of said pin and the other separate therefrom, said glands comprising body portions fitted to the holes in the valve casing and flanged outer portions, said separate gland being provided in its inner end with a bearing adapted to receive the end of said pin remote from the gland formed thereon, means applied to said glands to prevent rotation thereof and to draw the flanges thereon into close contact with opposed surfaces on the valve casing, and means to prevent leakage from the valve casing through the holes in the valve casing in which said pin is mounted.

8. A dry pipe valve as specified in claim 7, in which bushings are secured in the holes in the valve casing to which the body portions of the glands for mounting the pivot pin are fitted directly, said bushings being longer than the body portions of said glands and being proportioned so that proper clearance will be provided between their inner ends and the ends of the pivot bearing of the guide arm pivoted upon said pin.

9. A dry pipe valve as specified in claim 7, in which the pivot pin for the guide arm and the glands for mounting said pin are longitudinally symmetrical and said glands are interchangeable in the holes formed to receive them in the valve casing, thereby providing for inserting said pin from either side of the valve casing and either side up without affecting its designed operation.

10. A dry pipe valve as specified in claim 1, in which the differential valve is hollow and is provided with a hole adapted for connecting the chamber therein with the water admission opening of the valve casing when said valve is closed, whereby in use, the chamber in said valve will be charged with fluid under pressure which when the valve opens will be discharged in the form of a jet and by reaction against the column of water entering the valve casing through the admission opening will generate a force tending to open said valve into open position.

11. A dry pipe valve as specified in claim 1, in which the water-valve and air-clapper form a hollow unitary structure provided with a hole which, when said valve is closed, connects the chamber therein with the water admission opening of the dry pipe valve casing, whereby in use, the chamber in said unitary valve structure will be charged with fluid under pressure which when said unitary valve structure opens will be discharged in the form of a jet and by reaction against the column of water entering the dry pipe valve casing through the admission opening will generate a force tending to turn said unitary valve structure into open position.

12. A dry pipe valve as specified in claim 1, in which the water-valve and air-clapper form a hollow unitary structure provided with a hole which, when said valve is closed, connects the chamber therein with the water admission opening of the dry pipe valve casing, whereby in use, the chamber in said unitary valve structure will be charged with fluid under pressure which when said valve opens will be discharged in the form of a jet and by reaction against the column of water entering the dry pipe valve casing through the water admission opening will generate a force tending to open said unitary valve structure into turn position, and the wall of the valve in which the jet orifice is formed converging towards said orifice whereby when said valve is set for operation water contained in said chamber will drain out.

13. A dry pipe valve as specified in claim 1, in which the air-clapper comprises a body portion and a flexible gasket secured thereto and which projects beyond the outer edge thereof, and the valve seat for the air-clapper is convexly curved the relation being such that said gasket will contact with said valve seat on a line closely adjacent to the inner edge of said seat and also, closely adjacent to the outer edge of said gasket.

14. A dry pipe valve comprising a casing provided with water admission and discharge openings, a differential valve comprising a water-valve and a relatively large air-clapper adapted for maintaining said water-valve closed under contemplated operating conditions, means for supporting and guiding said air-clapper in its opening and closing movements, and means to prevent the formation of eddy currents behind said air-clapper as it approaches open position.

15. A dry pipe valve as specifed in claim 14, in which the means to prevent the formation of eddy currents consists of a baffle plate formed on the valve casing, the outer edge of which extends into close proximity to the rear side of the air-clapper when said clapper is fully open.

16. A dry pipe valve as specified in claim 14, in which the means to prevent the formation of eddy currents consists of a baffle plate formed on the valve casing, the outer edge of which conforms substantially to the shape of the rear side of the air-clapper and extends into close proximity thereto when the air-clapper is fully open, but with slight clearance at all points.

17. A dry pipe valve comprising a casing having a valve seat formed therein, a clapper having a valve adapted to close upon said seat, a shaft rigidly secured in the casing, said shaft having a portion formed as a key, a member upon the clapper having a circular aperture therethrough embracing said shaft when the valve is in seated position, said member having an offset recess opening into said aperture, positioned and shaped to receive said key in locking engagement when the clapper is in the open position relatively to the valve seat.

18. A dry pipe valve comprising a casing having a valve seat formed therein, a clapper having a valve adapted to close upon said seat, a shaft secured in the casing, said shaft having opposite flat faces formed thereon extending parallel with the length of the shaft, a member upon the clapper having a circular aperture formed therethrough embracing said shaft when said valve is upon its seat, said member having an offset recess opening into said aperture and formed with opposite parallel sides positioned to lockingly engage said parallel faces of the shaft when said valve is moved to the open position.

19. A dry pipe valve comprising a casing having a valve seat formed therein, a clapper having a valve adapted to open and close relatively to said seat, a shaft rigidly mounted in the casing, a member upon the clapper having a circular opening formed therethrough embracing said shaft when the valve is on its seat and adapted to permit said member to rotate concentrically about said shaft, said shaft having a cut away portion located within said opening, and said member having a recess formed therein communicating with and positioned eccentrically to said opening and shaped to receive and lockingly engage with said cut away portion of the shaft when the clapper is turned to the open position relatively to said seat for locking the clapper in said open position.

In witness that I claim the foregoing as my invention, I affix my signature this 8th day of June, A. D. 1926.

BYRON B. CARTER.